UNITED STATES PATENT OFFICE.

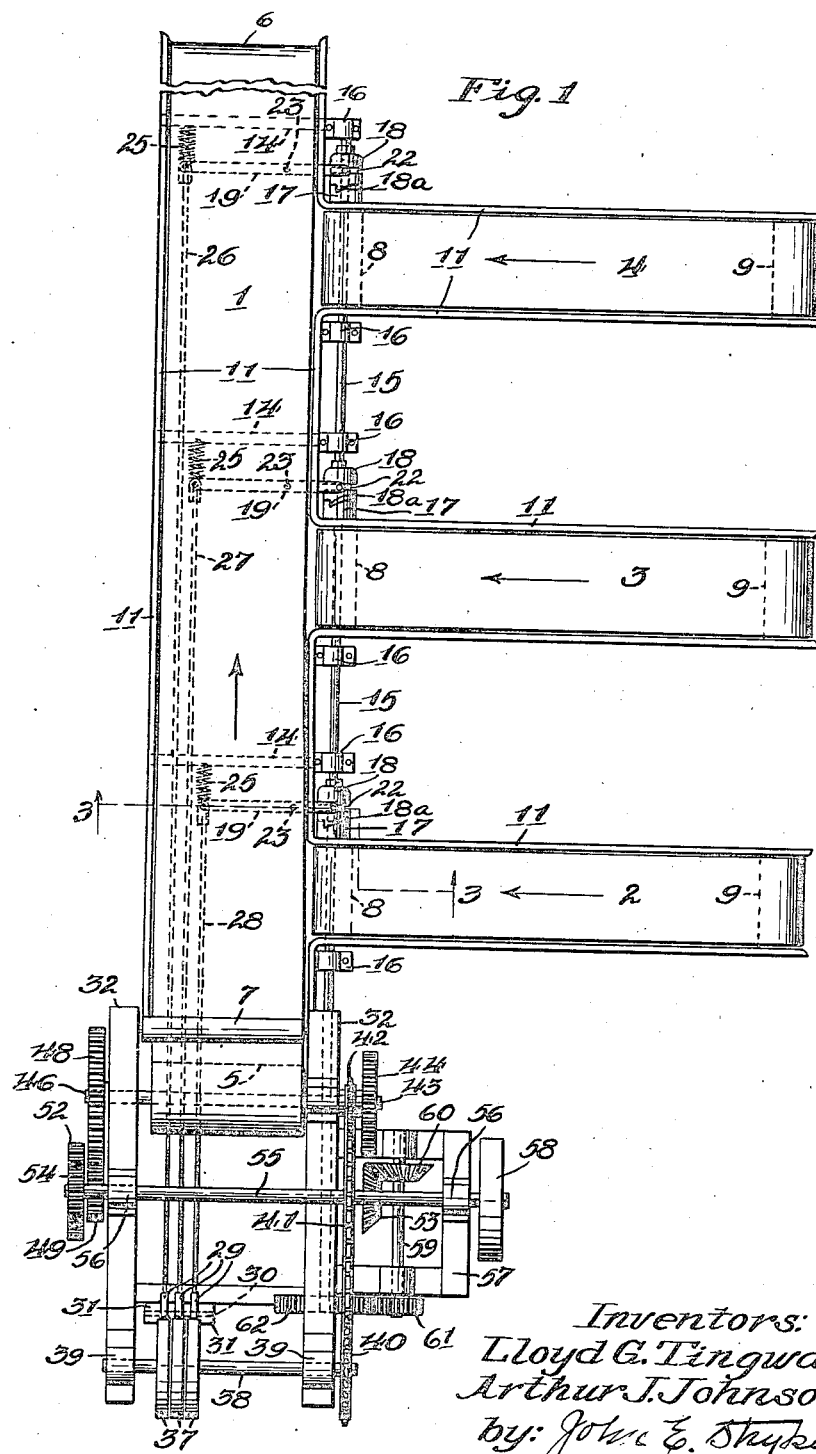

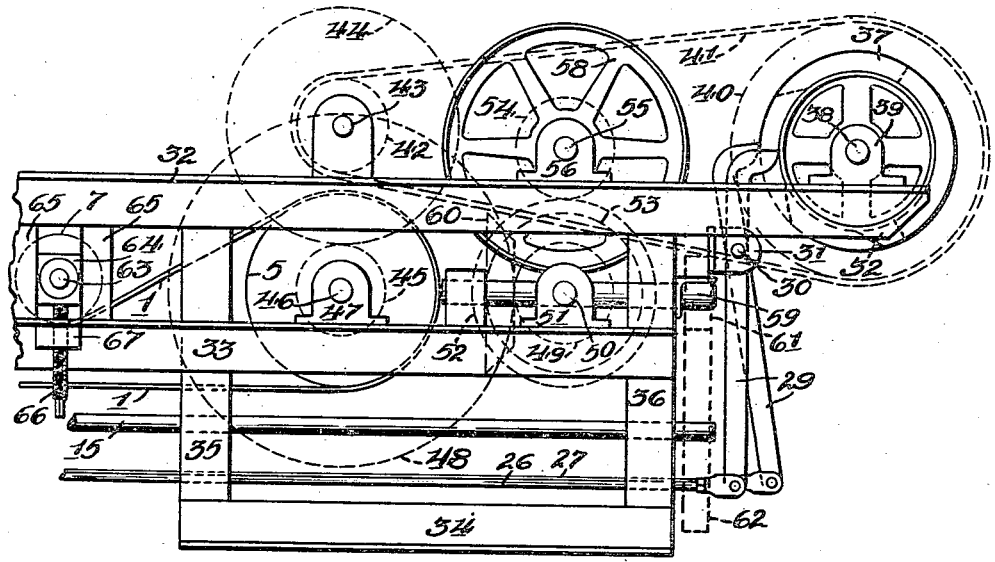
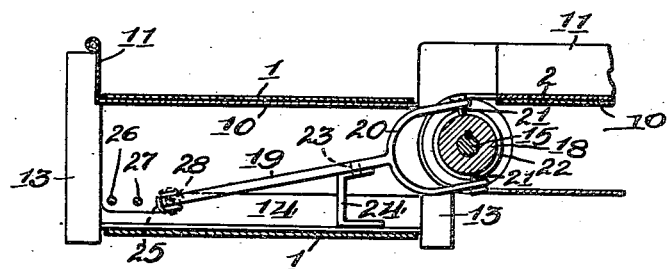
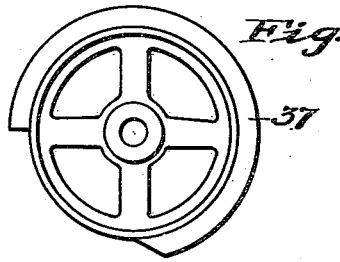

LLOYD G. TINGWALL AND ARTHUR J. JOHNSON, OF ST. PAUL, MINNESOTA, ASSIGNORS TO STANDARD CONVEYOR COMPANY, A CORPORATION OF MINNESOTA.

CONTROLLER FOR INTERSECTING CONVEYERS.

1,425,556.          Specification of Letters Patent.     Patented Aug. 15, 1922.

Application filed May 5, 1921. Serial No. 467,103.

*To all whom it may concern:*

Be it known that we, LLOYD G. TINGWALL and ARTHUR J. JOHNSON, citizens of the United States, residing at St. Paul, in the county of Ramsey and State of Minnesota, have invented new and useful Improvements in Controllers for Intersecting Conveyers, of which the following is a specification.

The object of our invention is to provide efficient means for controlling the travel of packages over a plurality of intersecting power conveyers.

More particularly it is our object to provide means for preventing congestion or jamming on a main or trunk line conveyer at the intersection of said main line with feeding or auxiliary conveyers.

Other objects of our invention will appear and be more fully pointed out in the following specification and claims.

The drawings, forming a part of this specification, illustrate what we at present believe to be the best form of our device but it will be readily understood that modifications are possible within the spirit of our invention.

Referring to the accompanying drawings Figure 1 is a plan view of our improved controlling mechanism as it is used on a conveyer system; Fig. 2 is a side elevation of the power end of our device, the gearing being indicated in dotted lines for clearness; Fig. 3 is a section taken on the line 3—3 of Figure 1 and Fig. 4 is a detail elevation of one of the cams.

Our improved controller, as illustrated, is mounted upon a conveyer system consisting of a main or trunk line belt 1 and three auxiliary belts 2, 3 and 4 arranged to deliver packages or the like to the belt 1. The latter belt passes around drums 5 and 6 at its ends, is driven by the drum 5 and is provided with a take-up roller 7 near said drum 5.

The belts 2, 3 and 4 are mounted at their ends on drums 8 and 9, being driven by the drums 8 and the upper run of each of the belts 1, 2, 3 and 4 is supported by a trough 10 having upwardly projecting sides 11. These sides form guides for packages on the belts. The troughs 10 are supported by legs 13, the lower ends of which are connected by transverse braces 14.

The drums 8 are severally revoluble on a continuous shaft 15, which is supported in bearings 16, and each of said drums is provided at one end with a cylindrical extension 17 having notches in its end adjacent to a clutch member 18. These clutch members are slidable longitudinally on the shaft 15 but are provided with keys so as to rotate with said shaft. Longitudinal movement is imparted to the clutch members 18, by levers 19 which are formed with yokes 20 (having studs 21 in their ends) arranged to engage said member 18 in an annular groove 22. The levers 19 are pivotally mounted by means of pins 23 upon brackets 24 and the latter brackets are in turn mounted upon the transverse braces 14 of the belt support. Teeth 18ª, formed to engage the notches in the extension 17, are provided on the end of the clutch member 18 and said teeth are resiliently held in engagement with said notches by springs 25 which are severally connected at one end to the braces 14 and at the other end to the levers 19.

Rods 26, 27 and 28 severally connect the ends of the levers 19, adjacent to the spring 25, to the lower ends of a series of substantially vertical levers 29. The latter levers are pivotally mounted upon a pin 30 in brackets 31 and said brackets are rigidly mounted on a frame consisting of horizontal angle irons 32, 33 and 34 and vertical angle irons 35 and 36. The levers 29 are arranged to be actuated by three cams 37, rigidly mounted upon a horizontal shaft 38. This shaft is revoluble in bearings 39 on the members 32 of the frame and a sprocket gear 40, fast on one end of said shaft is arranged to be driven by a chain 41. A small sprocket gear 42 fast on a shaft 43, drives the chain 41 and a gear 44 is also rigidly mounted on the shaft 43 and arranged to be driven by a pinion 45 on a shaft 46. The shaft 46 extends transversely through the frame, being journalled in brackets 47 on the members 33, and said shaft passes axially through the large drum 5 (said drum being fast on said shaft) for driving the belt 1. A large gear 48, secured to the shaft 46 on its end opposite the pinion 45, is arranged to be driven by a pinion 49 on a shaft 50 which extends through the frame parallel with the shaft 46. Journal bearings 51 support the shaft 50 upon the members 33 of the frame; a gear 52 is mounted on the end of said shaft adjacent to the gear 49, and the opposite end of said shaft is provided with a beveled gear 53. The gear 52 is driven by a pinion 54 on a shaft 55 directly above the shaft 50 and the latter shaft is journalled in bearings 56 mounted on the upper surface of one of the members 32 and on an extension 57 of the frame. A pulley 58 is designed to be driven by a belt from a suitable motor, being rigidly mounted on the end of the shaft 55 opposite the pinion 54.

The shaft 15, for driving the belts 2, 3 and 4, is operatively connected to the beveled gear 53 as follows; a shaft 59, journalled in suitable bearings on the upper surface of the projection 57 of the frame, is supplied near one end with a beveled gear 60 which meshes with the gear 53 and the opposite end of said shaft is provided with a pinion 61 for driving a gear 62 on the end of the shaft 15.

The take-up drum 7 is provided to adjust the tension in the main belt 1 and is mounted on a shaft 63 in journal bearings 64. These bearings 64 are slidable between guides 65 and arranged to be held in any desired position between said guides by screws 66. These screws are threaded in supports 67 mounted on the horizontal angle irons 33 of the frame; the upper ends of said screws are secured in the bearings 64, and their lower ends are formed so as to be turned by a suitable wrench.

Operation.

In operation the pulley 58 is continually driven in the appropriate direction by a suitable motor which, through the shaft 55, gears 54 and 52, the shaft 50, gears 49 and 48 and the shaft 46, drives the drum 5, carrying the belt 1, to move the upper run of said belt in the direction indicated by an arrow in Figure 1. The shaft 15 is also continually driven through the gears 62 and 61, the shaft 59 and the gears 60 and 53 from the shaft 50.

By our improved controller the auxiliary belts 2, 3 and 4 are successively caused to deliver packages to the belt 1, only one of said auxiliary belts being operated at a time. This operation is accomplished by successively disengaging the several clutches 18 from the drums 8. As the shaft 46, carrying the drum 5 rotates, the cams 37 are slowly turned through the gears 45 and 44, the shaft 43, the sprocket 42, the chain 41, the sprocket 40 and the shaft 38. The cams 37 are so positioned on the shaft 38 that the upper ends of the levers 29 will be successively actuated by the high portions of said cams. The springs 25 hold the upper ends of the levers 29 in contact with the periphery of the cams 37. Now, as will be readily understood, when the upper end of each lever 29 moves from the higher to the lower surface of the adjacent cam 37, the rod 26, 27 or 28, connected to said lever, will be moved, together with one of the levers 19 by one of the springs 25 to engage one of the clutches 18 with the adjacent drum 8 and thereby drive one of the belts 2, 3 or 4. When the upper end of each of the levers 29 moves from the lower to the higher surface of the adjacent cam 37, the clutch 18 in connection with said lever will be withdrawn from engagement with the adjacent drum 8 to stop the auxiliary belt operated by said drum. Thus, in operation the belt 2 is driven and the belts 3 and 4 are stopped during a predetermined part of a revolution of the shaft 38; then the operation of the belt 2 is stopped and the belt 3 is started (the belt 4 being already stationary) for a like part of a revolution of said shaft. The belt 4 is next automatically started, the belts 3 and 2 being stationary and the above cycle is repeated. As a result, packages placed upon the conveyers 2, 3 and 4 are delivered to the main conveyer 1 but congestion or jamming is rendered impossible because the conveyers 2, 3 and 4 make delivery one at a time.

Having described our invention what we claim as new and desire to protect by Letters Patent is:

1. In a device of the class described, a main conveyer, a plurality of auxiliary conveyers arranged to deliver packages to said main conveyer, a shaft to drive said auxiliary conveyers, clutches arranged on said shaft and means for operating said clutches to periodically connect and disconnect said auxiliary conveyers from said shaft.

2. In a device of the class described, a main conveyer, a plurality of auxiliary conveyers arranged to deliver packages to said main conveyer, a shaft to drive said auxiliary conveyers, clutches arranged on said shaft to severally connect and disconnect said auxiliary conveyers from said shaft and means for operating said clutches comprising a cam shaft, cams on said shaft, means operatively connecting said cams with said clutches and means for rotating said cams.

3. In a device of the class described, a main conveyer, a plurality of auxiliary conveyers arranged to deliver packages to said main conveyer, a shaft to drive said auxiliary conveyers, clutches arranged on said shaft to severally disconnect said auxiliary conveyers from said shaft and means for operating said clutches comprising a cam shaft, cams on said shaft, levers adapted to be operated by said cams, means operatively connecting said levers with said clutches and means for rotating said cams.

4. In a device of the class described, a main conveyer, a plurality of auxiliary conveyers arranged to deliver packages to said main conveyer, a shaft to drive said auxiliary conveyers, clutches arranged on said shaft to disconnect said auxiliary conveyers from said shaft and means for operating said clutches to alternately and severally connect and disconnect said auxiliary conveyers from said shaft comprising a frame, a power shaft journalled in said frame, a cam shaft journalled in said frame, gearing connecting said cam and power shafts, cams on said cam shaft and means operatively connecting said cams with said clutches.

5. In a device of the class described, a main conveyer, a plurality of auxiliary power conveyers arranged at an angle to said main conveyer and adapted to deliver packages thereto, means for driving said conveyers, and means for connecting and disconnecting said driving means with said auxiliary conveyers severally, whereby said last mentioned conveyers are caused to move one at a time.

6. In a device of the class described, a main conveyer, a plurality of auxiliary conveyers arranged at an angle to said main conveyer and adapted to deliver packages thereto, means for driving said main conveyer, a single shaft arranged to drive said auxiliary conveyers and means for connecting and disconnecting said shaft with said auxiliary conveyers severally whereby said last mentioned conveyers are caused to move one at a time.

In testimony whereof, we have hereunto signed our names to this specification.

LLOYD G. TINGWALL.
ARTHUR J. JOHNSON.